United States Patent [19]
Goldfischer

[11] 3,974,500
[45] Aug. 10, 1976

[54] VELOCITY SENSING APPARATUS

[75] Inventor: Lester I. Goldfischer, New Rochelle, N.Y.

[73] Assignee: The Singer Company, Little Falls, N.J.

[22] Filed: Jan. 13, 1975

[21] Appl. No.: 540,638

[52] U.S. Cl. ........................................ 343/8; 343/9
[51] Int. Cl.² ........................ G01S 9/46; G01S 9/48
[58] Field of Search ........................................ 343/8

[56] References Cited
UNITED STATES PATENTS

| | | | |
|---|---|---|---|
| 3,143,734 | 8/1964 | Raabe | 343/8 X |
| 3,147,477 | 9/1964 | Dickey, Jr. | 343/8 |
| 3,859,660 | 1/1975 | Augustine et al. | 343/8 X |

*Primary Examiner*—Malcolm F. Hubler
*Attorney, Agent, or Firm*—T. W. Kennedy

[57] ABSTRACT

Velocity sensing apparatus which permits measuring the velocity magnitude and sense of direction using the single radiating antenna illuminating a spot on the ground from which power is back-scattered to three receiving antennas. The receiving antenna outputs are grouped into pairs and processing of the signals done to obtain direct sum and quadrature sum waveforms with the point of crossing of the spectrum of the direct sum and quadrature sum waveform indicating the magnitude of velocity and the sign of the slope of the spectrum of the quadrature sum waveform determining the direction of the velocity.

14 Claims, 15 Drawing Figures

VELOCITY SENSING APPARATUS

The invention herein described was made in the course of or under a contract or subcontract thereunder, with the Department of the Navy.

BACKGROUND OF THE INVENTION

This invention relates to velocity sensing in general and more particularly to a radar velocity sensing technique used in aircraft navigation and the like of an improved type which permits the sensing of not only velocity but the sense of direction of velocity.

In my prior co-pending U.S. application, Ser. No. 334,011, filed Feb. 20, 1973, now Pat. No. 3,838,424, issued Sept. 24, 1974, I disclosed a velocity sensing apparatus in which a single radiating horn illuminates a spot on the ground from which power is backscattered to a pair of spaced receiving antennas. Because of the relative motion between the transmitting antenna and the ground, the backscattered radar speckled pattern which is developed moves as a whole in the opposite direction permitting the disclosed system to make use of that fact and measure the time required for the pattern to traverse the distance between the two receiving antennas by determining the frequency at which there is equal power in the sum and difference of the outputs of a quadratic detector coupled to each channel. Also disclosed is an additional antenna permitting measuring velocity in two directions by tracking the output of each of two pairs of the three antennas and providing them as inputs to a resolver system.

Although the disclosed system operates quite well, it is intended primarily for use in aircraft or other vehicles which generally travel in only one direction, e.g. such as a fixed wing aircraft always travels forward and never backward. In a vehicle like a fixed wing aircraft, the velocity along heading and across heading are the quantities measured. Alternatively, a system of this type can measure velocity along heading and drift angle. When used in such an application, there is no need for the system to be able to determine the sense of direction, i.e., whether it is forward or backward, since it is a preestablished fact that motion is always forward. However, if such a system is applied to another type vehicle, such as a helicopter which can travel backward, forward and sideways, the ability to detect the sense of direction becomes important.

In view of this, the need for an improved system of the type previously disclosed is evident.

SUMMARY OF THE INVENTION

The present invention provides such a system which permits not only measuring velocity magnitudes but also measuring the sense of motion. An antenna arrangement with a single-transmitting antenna and three receiving antennas essentially identical to that disclosed in my previous application is used. However, processing of the signals is done in a slightly different manner to obtain direct sum and quadrature sum waveforms with the point of crossing of the spectra of the direct sum and the quadrature sum wave form indicating the magnitude of velocity and the sign of the slope of the spectrum of the quadrature sum waveform determining the velocity direction. Also disclosed is switching apparatus so that the three antennas can be selectively paired in accordance with the direction in which the vehicle is moving.

DETAILED DESCRIPTION OF PREFERRED EMBODIMENT

Figure 1:
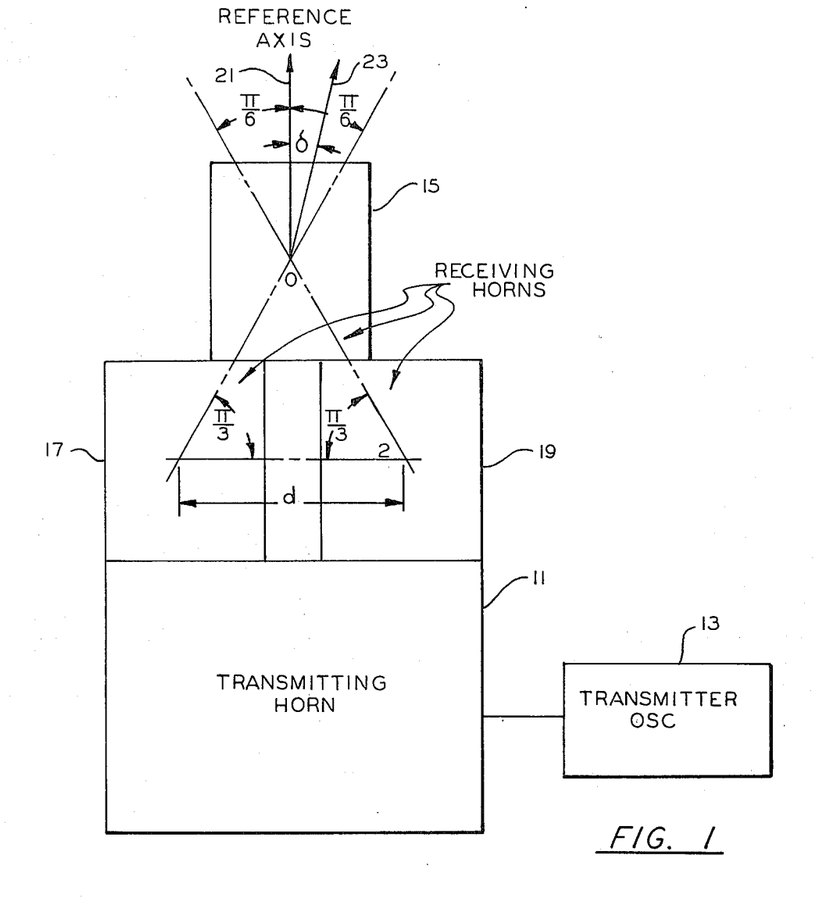
FIG. 1 is a plan view illustrating the general layout of the transmitting and receiving horns.

FIG. 1 illustrates a plan view of the transmitting and receiving horns. Transmitting horn 11 is driven by a transmitter oscillator 13 in conventional fashion. As disclosed in my prior application, the back-scattered pattern is picked up by the receiving horns designated 15, 17 and 19. The horns have centers located equidistant from each other so that lines between the centers from an equilateral triangle having the sides of length d. This figure also illustrates the angular relationships involved. Shown is a reference axis 21, a velocity axis 23 and the various angular relationships. The angle between the extension of the two sides of the triangle and the reference axis is equal to $(\pi/6)$. The angle between the reference axis and the velocity direction 23 is designated $\delta$.

Figure 2:
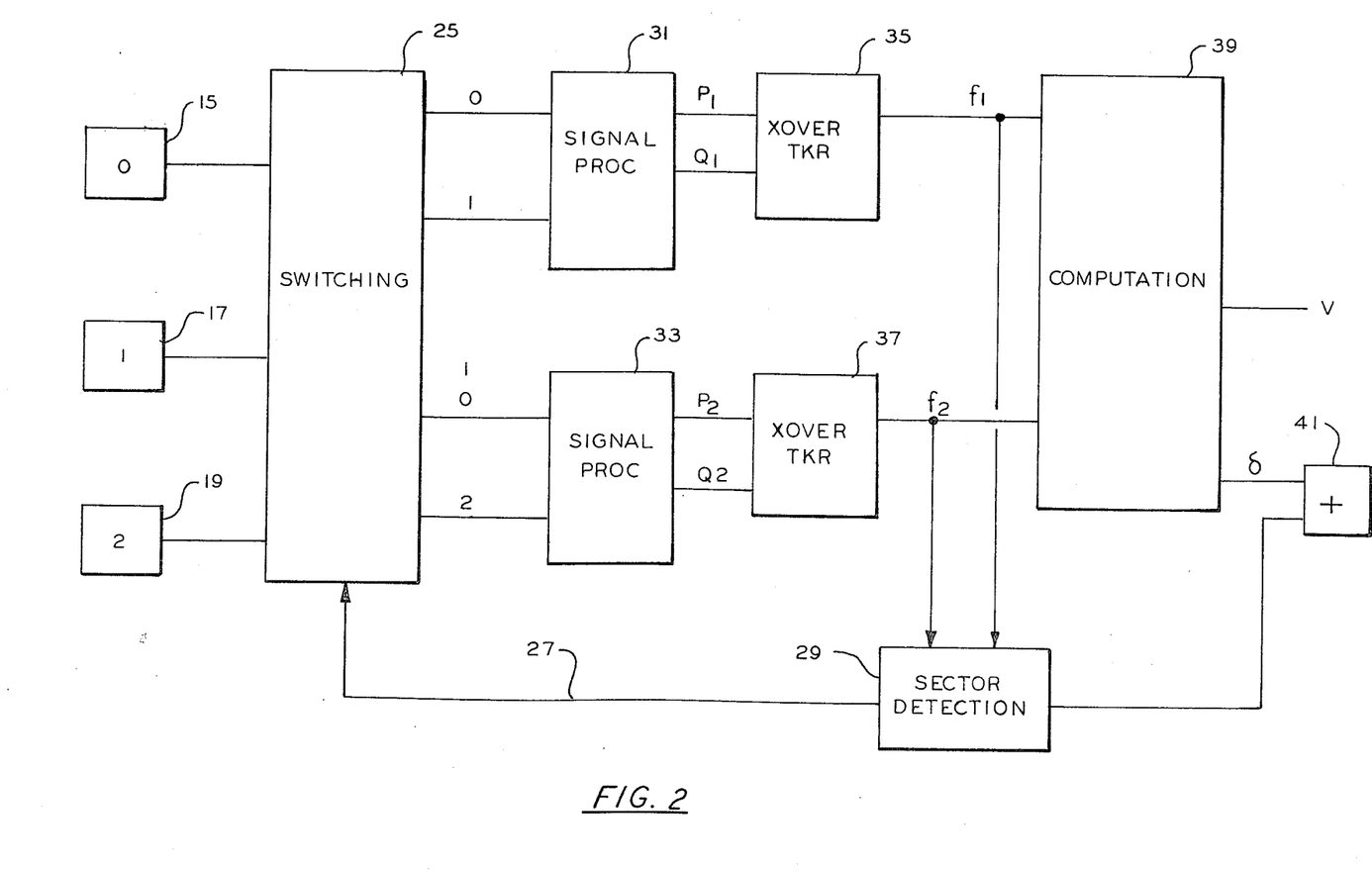
FIG. 2 is a block diagram of the system of the present invention.

In the block of FIG. 2, the receiving horns 15, 17 and 19 are again illustrated with their outputs provided into a switching module 25. The switching module 25 is controlled in response to an input on line 27 from a sector direction sensor 29. Switching is carried out in a manner to be described more fully below to properly pair the receiving horns depending on the direction of the velocity vector 23. As an example, if the velocity vector 23 were off to the right rear, then the reference axis 21 could be set up to extend from the right hand apex of the triangle. Sector selection is shown in detail on FIG. 10 along with the manner in which the receiving horns are paired. The numbers therein correspond to the numbers in the center of the receiving horns 15, 17 and 19 shown both on FIGS. 1 and 2. For purposes of discussion it will initially be assumed that the direction of the reference axis is as shown on FIG. 1 and that the pairs 01 and 02 are being used. These outputs are provided respectively to first and second signal processors 31 and 33. The signal processors to be described in detail below provide an output P representing the direct sum of two and an output Q representing the quadrature sum. The respective P and Q outputs are provided to first and second cross over trackers 35 and 37. Here the cross over frequencies are determined and provided as the respective $f_1$ and $f_2$ outputs to a computation block 39. Herein the velocity V and the drift angle $\delta$ are computed. The frequencies $f_1$ and $f_2$ are provided as inputs to a sector detection block in which they are used in switching between sectors in a manner to be more fully described below. The section detection block also provides an output to summing means 41 to add a value representing the angle of the reference axis to the drift angle to provide an output referenced to a reference direction fixed with respect to the vehicle.

Figure 3:
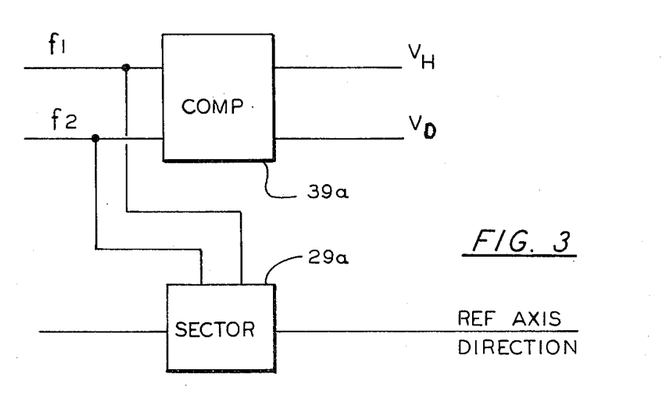
FIG. 3 is a block diagram illustrating an alternate embodiment of FIG. 2.

FIG. 3 illustrates in block diagram form a second embodiment of computer in which outputs $V_h$ and $V_d$ i.e., velocity along and across heading are provided as outputs. In this case, the sector detection block 29a provides an output representative of the reference axis direction to which the two values $V_h$ and $V_d$ are referenced.

Figures 4, 5:
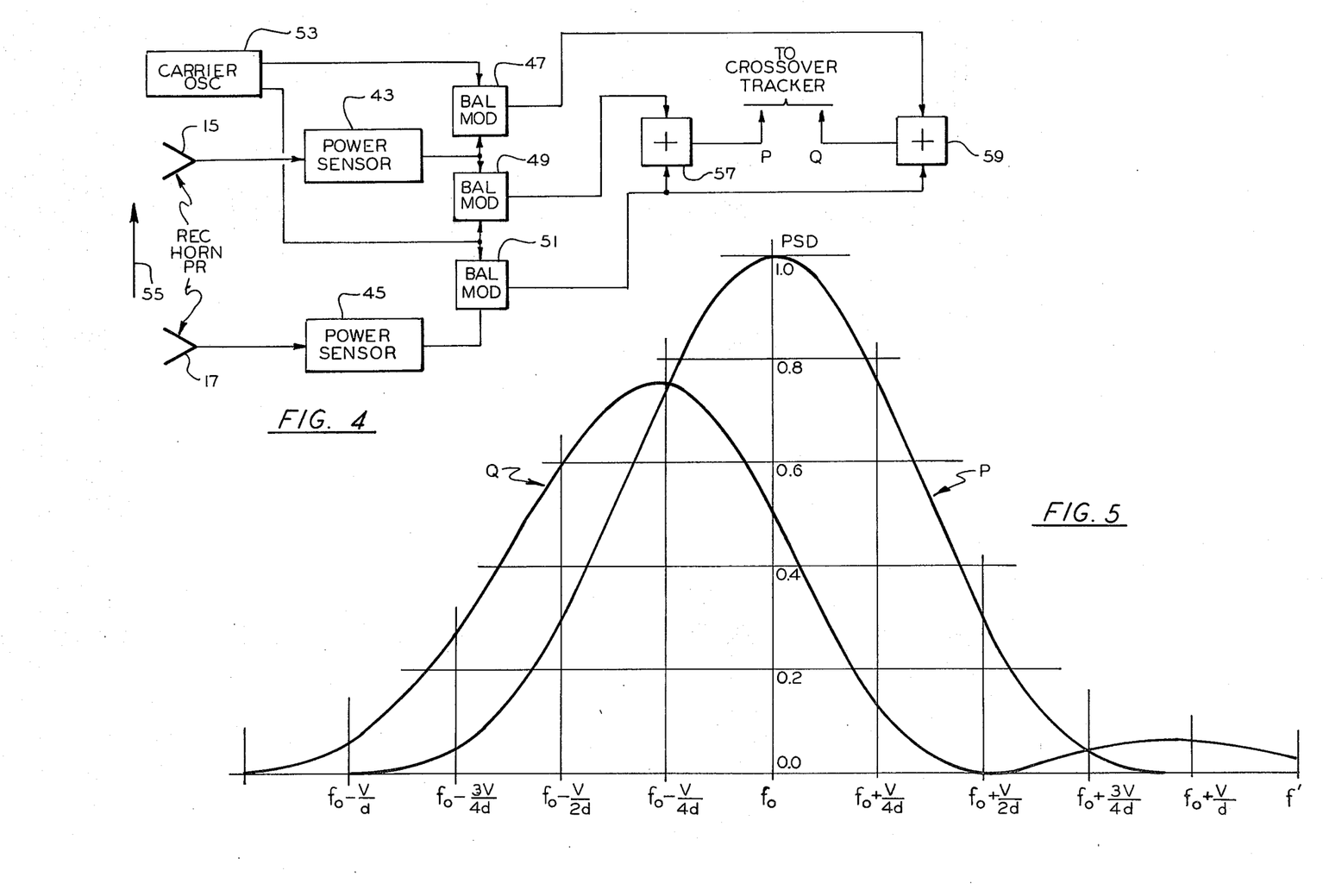
FIG. 4 is a block diagram of the signal processor of FIG. 1.
FIG. 5 is a graph illustrating the power spectral densities vs frequencies for the direct and quadrature sum outputs of the apparatus of FIG. 4.

FIG. 4 illustrates a processor such as the processor 31 or 33 of FIG. 2. In this figure, the switching unit 25 is not shown with the outputs of the receiving horns 15 and 17 indicated as being provided directly into respective power sensors 43 and 45. These power sensors are essentially the same as those described in my prior application. The output of the power sensor 43 is provided as an input to a balanced modulator 47 and to a balanced modulator 49. The output of power sensor 45 is provided as an input to the balanced modulator 51. The carrier frequency $f_o$ in phase is provided as second inputs to the balanced modulators 49 and 51. The input to the modulator 47 is the same frequency $f_o$ in quadrature phase. In this arrangement, the output of the power sensor coupled to each receiving horn is used to amplitude modulate the same carrier at $f_o$, in all three balanced modulators, the only difference among them being that the carrier is in quadrature phase at the balanced modulator 47. Operation can best be understood with reference to FIGS. 1 and 4. Assume that the vehicle is moving in the direction indicated by the velocity vector 23 of FIG. 1, i.e., the arrangement shown on FIG. 4 is moving in the direction of arrow 55. In that case, the output of power sensor 43 will lead the output of power sensor 45 in time. The lead time $\tau$ will be:

$$\tau = \frac{d}{2V}$$

where d is the separation of the two horns along the line of motion and V is the velocity, taken as positive in the up direction. If the waveform out of each power sensor were analyzed into Fourier components, at any given frequency $f$, the component in both upper and lower sensors would have the same magnitude but the phase of the upper sensor component would lead that of the lower sensor component by an amount $\theta$ where:

$$\theta = 2\pi F\tau = \frac{\pi F d}{V}$$

Each Fourier component of a power sensor waveform gives rise to a pair of components after being acted on a balanced modulator. If the original component is at the frequency $f$, at the output of the balanced modulator the two corresponding components would be at the frequencies $f_o \pm f$. The relative amplitude of all components after modulation will match those of their progenitors before modulation. However, the phase of any post-modulation component relative to the carrier will either be the same as or the negative of the phase of the generating premodulation term depending respectively on whether an upper or lower side band is involved. Thus, at the outputs of modulators 49 and 51 which use the same carrier, the components at the carrier frequency are exactly in phase. Above the carrier frequency the components derived from the horn 15 and power sensor 43 lead in phase components at the same frequency derived from the horn 17 and the power sensor 45, whereas below the carrier the relative phase becomes a lag. For equal displacement in frequency above and below the carrier, the same magnitude of phase difference exists between upper and lower balanced modulators using the same carrier. As a result, the power spectral density of the sum waveform after summing the outputs of balance modulator 49 and 51 in summing means 57 and which is indicated as P, will be as shown on FIG. 5. That is, it is symmetrical with respect to $f_o$ having the same shape above $f_o$ as the power spectral density of the sum waveform disclosed in my copending application had relative to zero frequency. The sum of the two balance modulators 47 and 49 is provided by summing means 59 and labelled as Q. The modulators 47 and 49 being in quadrature permits the ability to sense direction. The power spectral density of this waveform Q is also shown on FIG. 5. If it is assumed that the carriers have the same amplitude, which is easily achieved through the use of switching type modulators, then the components at frequency $f_o$ of the outputs of the two modulators 47 and 49, will have the same amplitude but will be in quadrature phase, the component associated with horn 15 and power sensor 43 leading. Above the carrier frequency the components generated by the power sensor 43 will lead by more than 90° the components at the same frequency generated by the power sensor 45 or below the carrier the lead angle will be reduced below 90°. Thus, for a finite range in frequency going just above the carrier, components generated by the power sensor 43 will combine more and more destructively with those generated by the power sensor 45 at the same frequency; going below the carrier on the other hand, the two sets of components will combine more and more constructively over the same finite range.

As a result of this type of behavior the power spectral density of the Q waveform is skewed with respect to $f_o$, the carrier frequency. For the assumed direction of motion, i.e., in the direction of arrow 55, the peak of the Q spectrum must lie below $f_o$ and below the peak of the P spectrum as shown in FIG. 5. If the velocity had been reversed in direction, the relative phases between corresponding components from upper and lower power sensors would have reversed, leads becoming lags and vice-versa. Since the 90° lead of the upper quadrature carries is fixed, with direction reversed, the phase lead between Q pairs of components increases below $f_o$ and decreases above $f_o$ thereby reversing the skew of the Q spectrum and placing its peak above $f_o$. The symmetry of the P spectrum with respect to $f_o$ and the position of the peak, however, remains unchanged. The displacement of the crossover point of the Q and P spectra from $f_o$ is a function only of $d$, the separation of the two receiving horns along the line of motion, and V, the velocity of the pair, thus preserving the principle attribute of my previous system. It should be recalled that the differences in the power spectral density of Q and P at any frequency $f'$ arises from the differences in the relative phase of the two components which are summed in each case; the amplitude of all components are the same. Thus, $f' = f_o + f$ where $f$ may be either positive or negative and denoting the phase of the upper horn component relative to the lower horn component in the P pair by $\alpha$ then:

$$\alpha = \frac{\pi f d}{V}$$

where $\alpha$ is in radians. Denoting the corresponding phase for the Q pair by $\beta$, $$\beta = \frac{\pi}{2} + \alpha$$

Crossover occurs when the magnitudes of $\alpha$ and $\beta$ are the same or $$\left| \frac{f_c d}{V} \right| = \left| \frac{\pi}{2} + \frac{\pi f_c d}{V} \right|.$$

which is satisfied when $$\frac{\pi f_c d}{V} = -\frac{\pi}{4}.$$

Therefore $$f_c = f_o - \frac{V}{4d}$$

and the location of the crossover frequency, $f_c'$, is given by $$f_c' = f_o - \frac{V}{4d}.$$

as expected; reversing the direction or sign of V shifts the crossover frequency to the opposite side of $f_o$.

Figure 6:
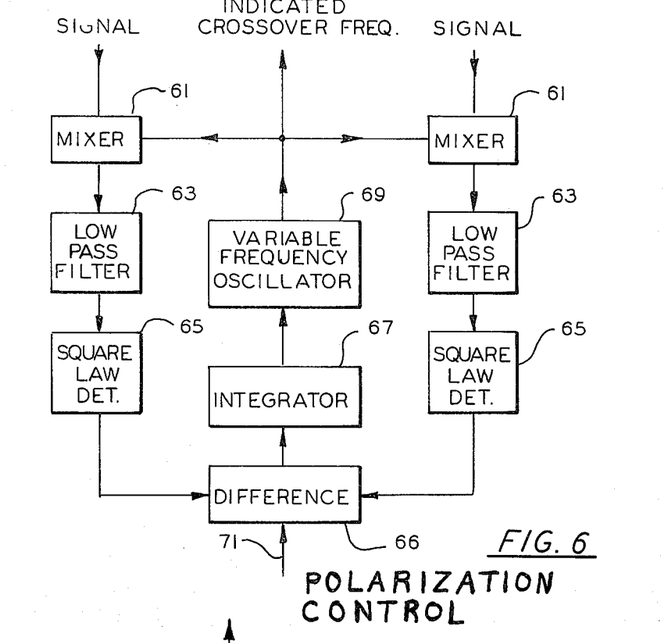
FIG. 6 is a block diagram of the cross-over frequency tracker of FIG. 2.

The P and Q outputs are provided to a frequency tracker such as the frequency tracker illustrated on FIG. 6. The power density in each of the signals P and Q in the vicinity of the tracking oscillator frequency sampled by means of one of the mixers 61, low pass filters 63 and square law detectors 65 and are then differenced in block 66. The difference between DC levels developed at the two detectors is used to drive an integrator 67 whose output controls the frequency of the tracking oscillator 69. Feedback polarities are such as to cause the tracking oscillator to seek and come to rest at the first crossover frequency, i.e., the first point where the P and Q channels have the same power density. The displacement, $f_c$, of this frequency from the carrier $f_o$, is given by the relationship $$f_c = \frac{V}{4d};$$

it is a direct measure of velocity. It will be recognized that the frequency tracker of FIG. 6 is essentially the same as that described in my previous application. There is one important difference however; differencing means 66 has an input 71 designated polarity control. This is necessary because of the fact that the present invention can operate in both senses of direction. Reference to FIG. 5 illustrates the reason why this polarity control is needed. If the polarity of the feedback in the frequency tracker is proper for the tracking oscillator to stabilize at the true crossover point, i.e., at $f_o - V/4d$, this means that if the tracking oscillator is set to $f_o$ before the loop is closed, after closure it will be driven down in frequency. From this one must conclude that if the algabraic difference P − Q at the tracking oscillator frequency is positive, then the loop will cause the oscillator frequency to decrease. Suppose that the velocity direction is reversed from that shown on FIG. 2. As far as the P spectrum is concerned, this has no effect but the Q spectrum will appear as the image, with respect to $f_o$ of what is shown on FIG. 5. The effect of this on Q is to cause the true crossover point to shift to $f_o + V/4d$ but no change has occurred in the algebraic difference P − Q at $f_o$. Thus, if the loop is closed with the tracking oscillator initially at $f_o$, it will be driven down in frequency instead of up as it should be. [In fact, for this condition, it would ultimately stabilize at $f_o - 3V/4d$ and have the wrong displacement from the carrier both in sign and in madnitude.] Thus, means must be provided in the differencing means 66 for changing feedback polarity. This can be implemented in simple fashion through the use of operational amplifier inverters controlled by field effect transistor switches themselves under the control of the polarity control input on line 71 of FIG. 6.

Figure 7:
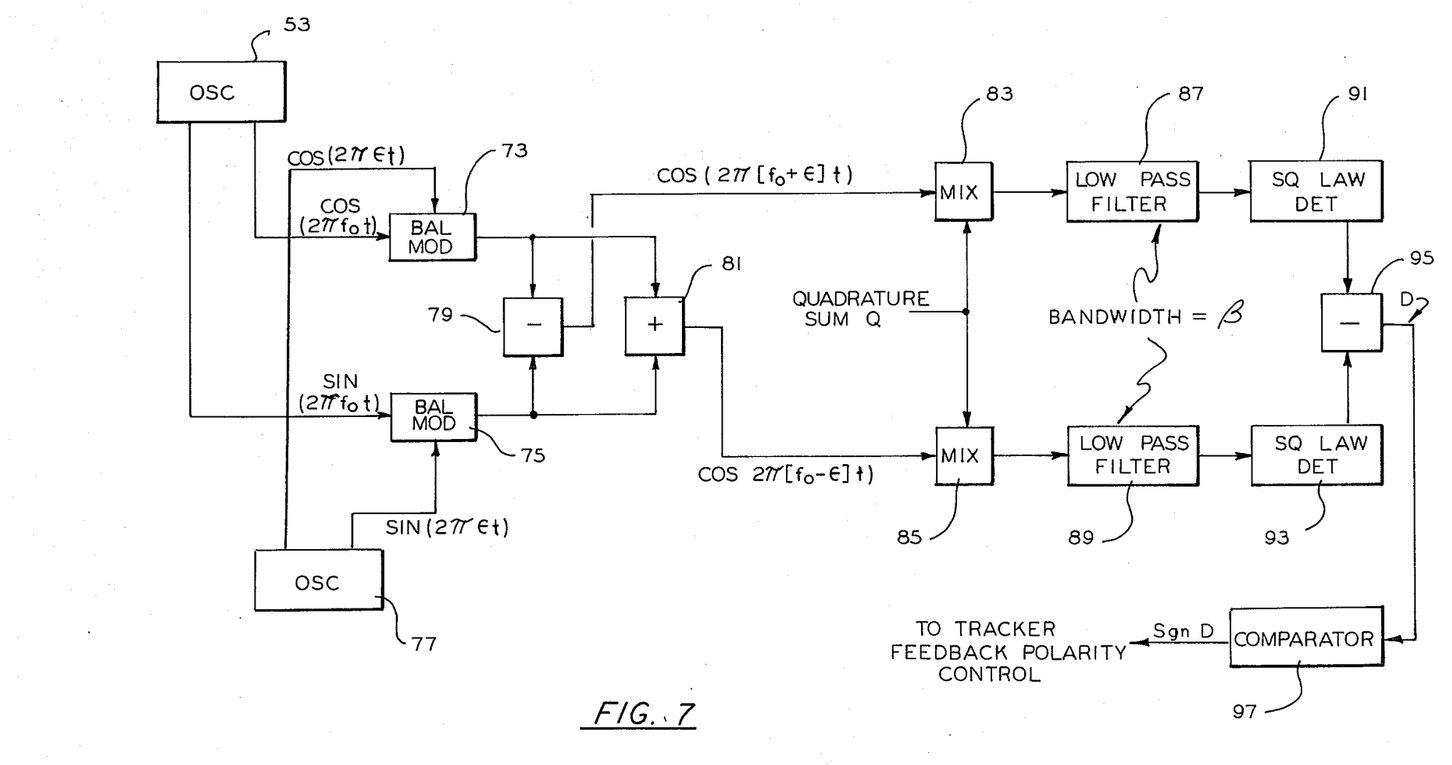
FIG. 7 is a block diagram of the slope detector of FIG. 2.
Figure 7A:
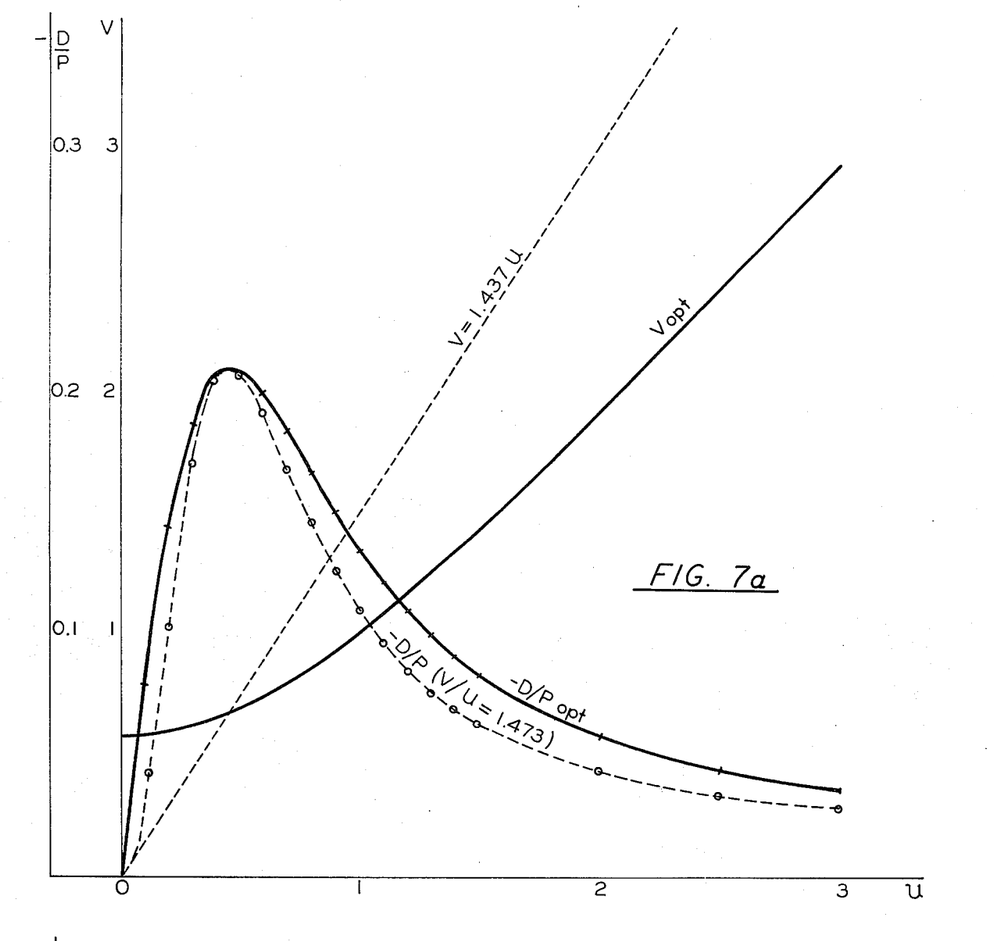
FIGS. 7a and 7b are plots helpful in understanding operation of the slope detector of FIG. 7.
Figure 7B:
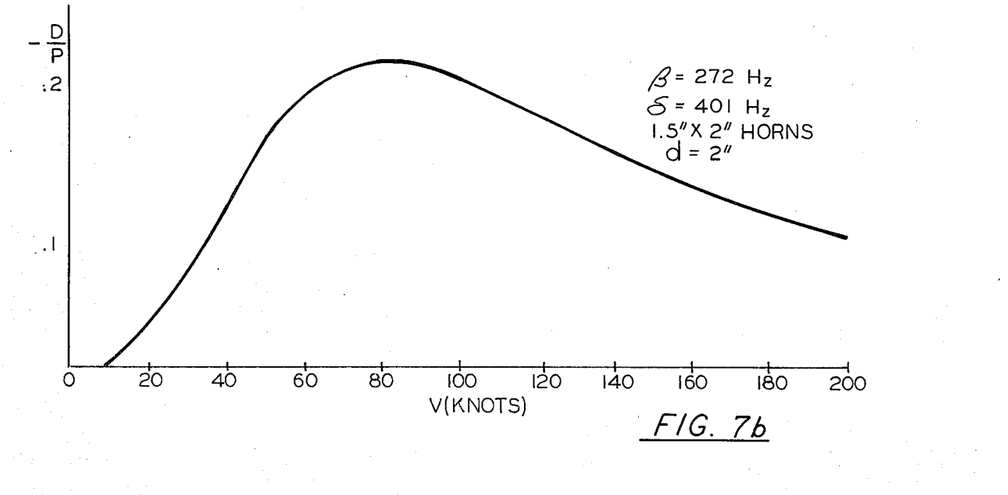

A circuit for determining the proper feedback polarity is shown on FIG. 7. What this circuit essentially does is to make this feedback polarity depend on the slope of the Q spectrum where it crosses $f_o$. Reference to FIG. 5 will show that in the illustrated case for a positive velocity the slope will be in one direction and for the opposite case where the Q signal is the image of that shown the slope will also be opposite. As illustrated, the frequency $f_o$ from the oscillator 53 is provided in quadrature as inputs to balanced modulators 73 and 75 respectively. A further oscillator 77 operating at a small differential frequency provides the second inputs to modulators 73 and 75 respectively to develop at their outputs a combination of these two frequencies which are then subtracted in a subtractor 79 and added in an adder 81. The result from the subtractor is a signal $\cos 2\pi [(f_o + \epsilon) t]$ and from the summing means 81 a signal $\cos 2\pi [(f_o - \epsilon) t]$. This effectively develops two bands symmetrically disposed around the carrier. These signals are then mixed with the quadrature sum signal Q in mixers 83 and 85 after-which they are provided through low pass filters 87 and 89 respectively to square law detectors 91 and 93 respectively. The square law detector outputs are provided to a subtractor 95 the output of which is provided to a comparator 97 whose output indicates the sign. That is, the comparator will have an output at one level for a positive sign and at another level for a negative sign. This arrangement effectively measures the power in the quadrature sum of two equal filter bands symmetrically disposed around the carrier and then takes the difference between the two power levels. Clearly, the sign of the difference must reverse when the sign of the slope of Q at $f_o$ reverses. If the filter band width and displacement from the carrier remain fixed as velocity varies, it is also clear that the magnitude of the difference will change with velocity. Analysis of this situation using Gaussian filters has been carried out. In summary, this analysis shows that at a given speed and input signal power for each filter band width in the slope measuring unit there is an optimum displacement from the carrier in terms of producing the highest power difference. The relationship between the ratios of filter band width, $u$, and displacement, $v$, relative velocity for optimum results is shown by the curve labelled Vopt in FIG. 7a; the optimum values of the difference, D/Popt versus filter band width ration is also shown on FIG. 7a. When band width and separation have a fixed ration, this may be adjusted to yield the optimum difference at a particular value of $u$ as illustrated by FIG. 7a. For the same ratio of band width and separation, the difference is shown as a function of velocity in FIG. 7b. Assuming that a 2.3 to 1 range of differences can be accomodated in determining the sign of the slope, then a 6 to 1 range of velocity is available from a single set of filters with a fixed offset. In view of this, as long as the requirements are within that range, only single filters 87 and 89 need be provided. It will be recognized by those skilled in the art that if wider velocity ranges are to be provided, swithable filters of proper band width B may be inserted into the circuit of FIG. 7.

Figure 8:
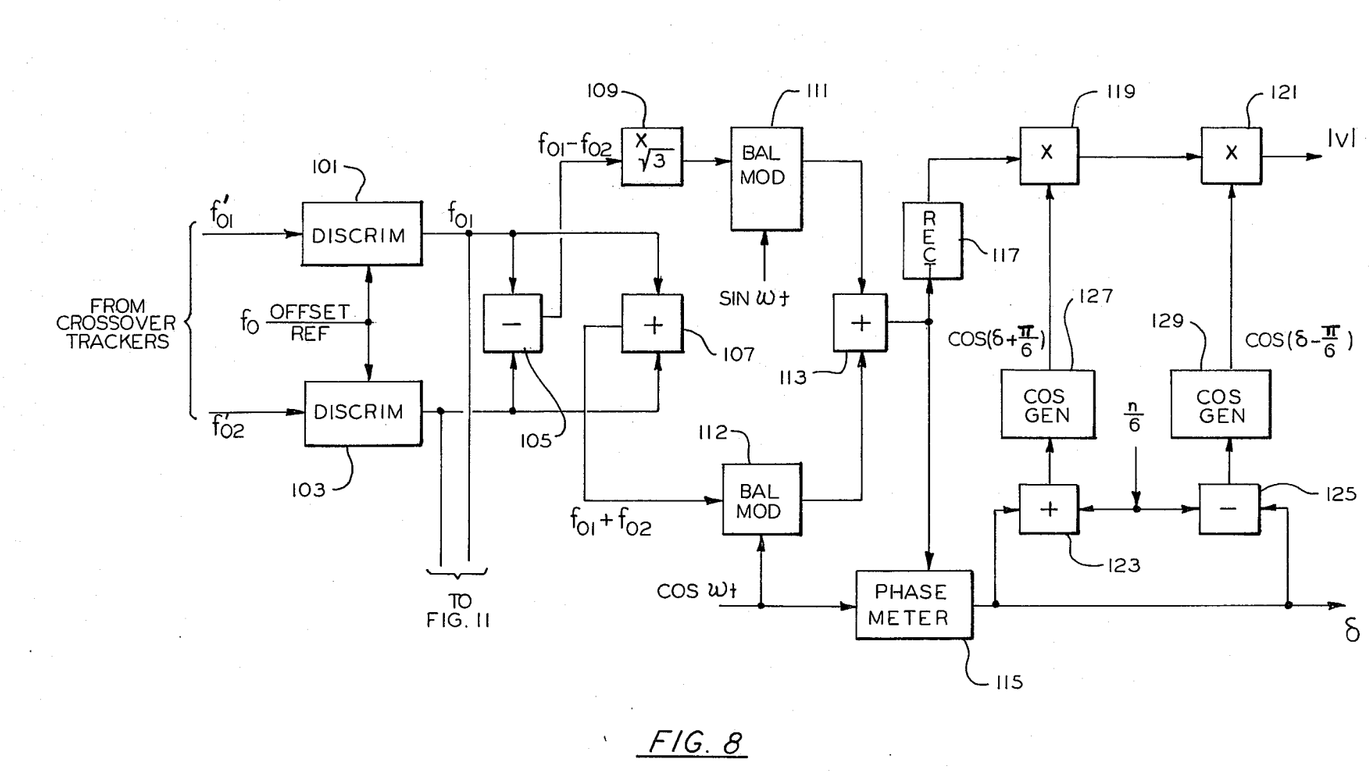
FIG. 8 is a block diagram illustrating a first embodiment of the computing portion of FIG. 2.

The two crossover trackers 35 and 37 of FIG. 2 provide their outputs into the computation means 39. The computations means are shown on FIG. 8. As illustrated on FIG. 1 for purposes of symmetry the horn centers are located at the apexes of an equalateral triangle. A line passing through the center of horn 15 and bisecting the angle formed by the lines connecting the centers of horns 15 and 17 and horns 15 and 19 is used as a reference axis. Assuming that the distance between horn centers is $d$ and that the velocity vector makes an angle of $\delta$ with respect to the reference axis, and denoting the displacement of the crossover frequency from the carrier by $f_{o1}$ for the 01 pair and $f_{o2}$ for the 02 pair, then $$f_{o1} = \frac{V}{4 d \cos (\delta + \pi/6)}$$

and $$f_{o2} = \frac{V}{4 d \cos (\delta - \pi/6)}$$

Taking into account that $$\cos ( \delta \pm \pi/6) = \tfrac{1}{2} ( \sqrt{3} \cos \delta \mp \sin \delta )$$

Then the sum and difference of $f_{o1}$ and $f_{o2}$ become $$f_{o1} + f_{o2} = \frac{\sqrt{3} V \cos \delta}{4d \cos (\delta + \pi/6) \cos (\delta - \pi/6)}$$

and $$f_{o1} - f_{o2} = \frac{V \sin \delta}{4d \cos (\delta + \pi/6) \cos (\delta - \pi/6)}$$

From these two equations, it should be clear that $$\sqrt{3} \frac{f_{o1} - f_{o2}}{f_{o1} + f_{o2}} = \tan \delta$$

and $$\sqrt{(f_{o1} + f_{o2})^2 + 3 (f_{o1} - f_{o2})^2} = \frac{\sqrt{3} V}{4d \cos (\delta + \pi/6) \cos (\delta - \pi/6)}$$

The first of the last two equations determines the drift angle, $\delta$ and both together determine the magnitude of velocity, $V$.

The circuit of FIG. 8 implements these equations. The frequencies $f_1$ and $f_2$ are designated $f'_{o1}$ and $f'_{o2}$ because of the receiving horns from which they are derived. These frequencies are provided to frequency discriminators 101 and 103 respectively which have as an offset reference input the frequency $f_o$. These identical broad band linear sine-cosine discriminators referenced to $f_o$ generate voltage analogs of the two displacement frequencies. These voltage analogs $f_{o1}$ and $f_{o2}$ are subtracted in a subtractor 105 and added in an adder 107. The difference from subtractor 105 is multiplied in a multiplier 109 by the square root of 3 and is used to drive a balanced modulator 111 keyed at an arbritary frequency. The sum signal similarly drives a balance modulator 112 keyed by the same frequency in quadrature phase. The two balanced modulator outputs are summed in summing means 113. The phase of the sum of these two signals relative to the phase of the keying signal [modulated by $f_{o1} + f_{o2}$] is the drift angle $\delta$. This angle is obtained by applying these two signals, i.e., the output of summing means 113 and the signal cos $\omega\tau$ to a phase meter 115 which provides as its output a signal representing $\delta$, the drift angle. The output of the summing means 113 is rectified in a rectifier 117 and is then provided to a first multiplier 119 the output of which is provided to a second multiplier 121. The signal $\delta$ is summed with a constant value proportional to ($\pi/6$) in summing means 123 and differenced with the same value in differencing means 125. The respective outputs of summing means 123 and differencing means 125 are provided to cosine generators 127 and 129 where the cosine of these outputs is taken and provided as the second input respectively to the multipliers 119 and 121. The final result is thus an output proportional to the absolute value of the velocity $V$. The direction of velocity may easily be determined by using the output signal of comparator 97 of FIG. 7.

Figure 10:
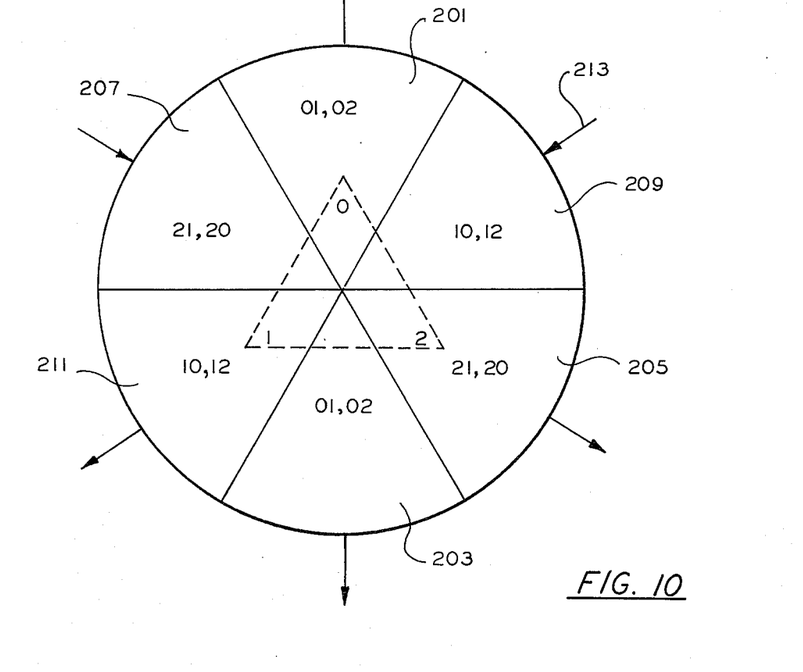
FIG. 10 is a diagram illustrating the horn pair, sector selection of the present invention.

Up to now the system has been described without mentioning anything about the switching module 25 of FIG. 2. This module would not be required if the velocity direction were never perpendicular to the line connecting either the centers of horns 15 and 17 or the center of horns 15 and 19. However, should such a situation occur as very well might in a helicopter, the distance between the pair in question projected on the velocity vector becomes zero. The associated crossover frequency would then become infinite creating an unmanageable situation for the processor. Thus, to handle such a situation, a sensing means designated a sector detector means 29 on FIG. 2 is provided. In general terms, this sensing means senses the deviation of the velocity vector from the reference vector and causes a switch over if that deviation exceeds 30°. FIG. 10 illustrates the horn pairs used for each 60° sector.

Before discussing in detail the means for sector detection, an alternate embodiment of the computation means corresponding to that shown on FIG. 3 will be described. This alternate scheme is a digital scheme and all elements up to the computation block will be identical to that described above. Again, in order to better understand operation of this system, FIG. 1 will be referred to with the horn 15 and 17 constituting one receiving pair and the horns 15 and 19 the other receiving pair. A line passing through the center zero of horn 15 and bisecting the angle formed by the lines connecting the centers of horn pairs 15 and 17 and 15 and 19 is again used as a system reference axis. The distance between the horn centers of any pair is designated $d$. If the velocity vector to be sensed has a magnitude of $V$ and makes an angle $\delta$ with respect to the reference axis then the displacement of the crossover frequency from the carrier for the 01 pair denoted by $f_{x1}$ is:

$$f_{x1} = \frac{|V|}{4d \cos(\delta - \pi/6)}.$$

the comparable quantity for the (0,2) pair — denoted by $f_{x2}$ — is:

$$f_{x2} = \frac{|V|}{4d \cos(\delta + \pi/6)}$$

In each of these formulas, the effective distance between horns is the projection of the actual distance onto the line of motion. From these two crossover displacement frequencies it is possible to derive the along heading velocity component, $V_H$, and the across heading velocity component, $V_D$, using only arithmetic operations.

To understand the basis for this last statement, it is first convenient to expand the trigonometric terms in the expressions for $f_{x1}$ and $f_{x2}$. Thus:

$$\cos(\delta \pm \pi/6) = \tfrac{1}{2}(\sqrt{3}\cos\delta \mp \sin\delta).$$

Using this result, the sum and difference of the crossover displacements may be written as follows:

$$f_{x2} + f_{x1} = \frac{\sqrt{3}|V|\cos\delta}{4d \cos(\delta + \pi/6)\cos(\delta - \pi/6)}$$

$$f_{x2} - f_{x1} = \frac{|V|\sin\delta}{4d \cos(\delta + \pi/6)\cos(\delta - \pi/6)}$$

Proceeding further, the common denominator in the last two expressions may be expanded to yield:

$$\cos(\delta + \pi/6)\cos(\delta - \pi/6) = \tfrac{1}{4}(3\cos^2\delta - \sin^2\delta)$$

$$= \tfrac{1}{4}\left(\frac{3 - \tan^2\delta}{1 + \tan^2\delta}\right).$$

Since the ratio of sum and the difference of the crossover displacement frequencies is:

$$\frac{f_{x2} - f_{x1}}{f_{x2} + f_{x1}} = \frac{\tan\delta}{\sqrt{3}}$$

the common denominator may be written in terms of $f_{x1}$ and $f_{x2}$ as follows:

$$\cos(\delta + \pi/6)\cos(\delta - \pi/6) = \tfrac{1}{4}\left[\frac{3 - 3\left(\frac{f_{x2}-f_{x1}}{f_{x2}+f_{x1}}\right)^2}{1 + 3\left(\frac{f_{x2}-f_{x1}}{f_{x2}+f_{x1}}\right)^2}\right] = \tfrac{3}{4}\left[\frac{4f_{x1}f_{x2}}{4f_{x1}^2 - 4f_{x1}f_{x2} + 4f_{x2}^2}\right]$$

$$= \tfrac{3}{4}\left[\frac{1}{f_{x1}/f_{x2} + f_{x2}/f_{x1} - 1}\right]$$

From all of the foregoing, the along heading and cross heading components of velocity, $V_H$ and $V_D$ respectively, turn out to be related to the crossover displacement frequencies, $f_{x1}$ and $f_{x2}$, by the expressions:

$$V_H = V\cos\delta = \left(\frac{f_{x2}+f_{x1}}{\sqrt{3}}\right)\left(\frac{3d}{f_{x1}/f_{x2} + f_{x2}/f_{x1} - 1}\right)$$

$$V_D = V\sin\delta = (f_{x2} - f_{x1})\left(\frac{3d}{f_{x1}/f_{x2} + f_{x2}/f_{x1} - 1}\right)$$

Only three of the four arithmetic operations are required to compute $V_H$ and $V_D$ from $f_{x1}$ and $f_{x2}$, viz. addition, subtraction and division. Implementation of the division operation using three preset counters 131, divisor counter 133, a dividend counter and 135 a quotient counter, two groups of inverters 137 and 138 along with some gates 139, 141 and 143 and conventional support logic 145 is shown on FIG. 9. The clock input at frequency $f$ is provided through gates 139 and 141 to divisor counter 131. Each time the divisor counter overflows, the complement of the divisor is preset into it and an additional pulse gated into the input over and above the normal stream of clock pulses. This is accomplished by the output $f/D$ on line providing an input to support logic 145 which then provides a load command on line 147 and the pulse on line 149. If the clock frequency is $f$ and the divisor is $D$, the overflow frequency $f/1$ from the counter is $f/1$ equals $f/D$. The complement of the dividend designated N is loaded into the dividend counter 133 in response to a load command on line 151. The same stream of clock pulses is fed into counter 133. From the output of the counter a gate interval T whose derived length is $T = N/f$ results. It is assumed that both N and D are positive and N is much greater than D. It is always possible to scale N up to meet this condition and then scale the quotient Q down by the same factor. The number of overflows of the divisor counter which occurs during the interval T are accumulated in the quotient counter through the gate 143. This number is $Q = f/D \times N/f = N/D$. All three counters are preset before each cycle of computation and the clock pulses driving the dividend and divisor counter gated on simultaneously by AND gate 139. Support logic 145 insures that this occurs a fixed delay after the overflow of dividend counter. In this discussion, it was assumed that the quotient counter would be preset to zero before each computation cycle. However, it would be just as easy to preset the counter to some non-zero positive or negative constant so that at the end of each cycle the constant would be algebraically summed with the accumulated quotient. Furthermore, if the constant is −1 and the quotient counter is reset after every second computing cycle with $f_{x1}$ as the dividend and $f_{x2}$ as the divisor during the first cycle and vice-versa during the second cycle, then after each pair of cycles the quotient counter will contain $f_{x1}/f_{x2} + f_{x2}/f_{x1} - 1$. Loading this result into the divisor counter of two orhter digital dividers whose dividend counters are alternately preset to $f_{x2}$ and $f_{x1}$ (and assuming that the quotient counter is an updown counter in one of these units) the result will be $$\frac{f_{x2} \pm f_{x1}}{f_{x1}/f_{x2} + f_{x2}/f_{x1} - 1}$$

Figure 9:
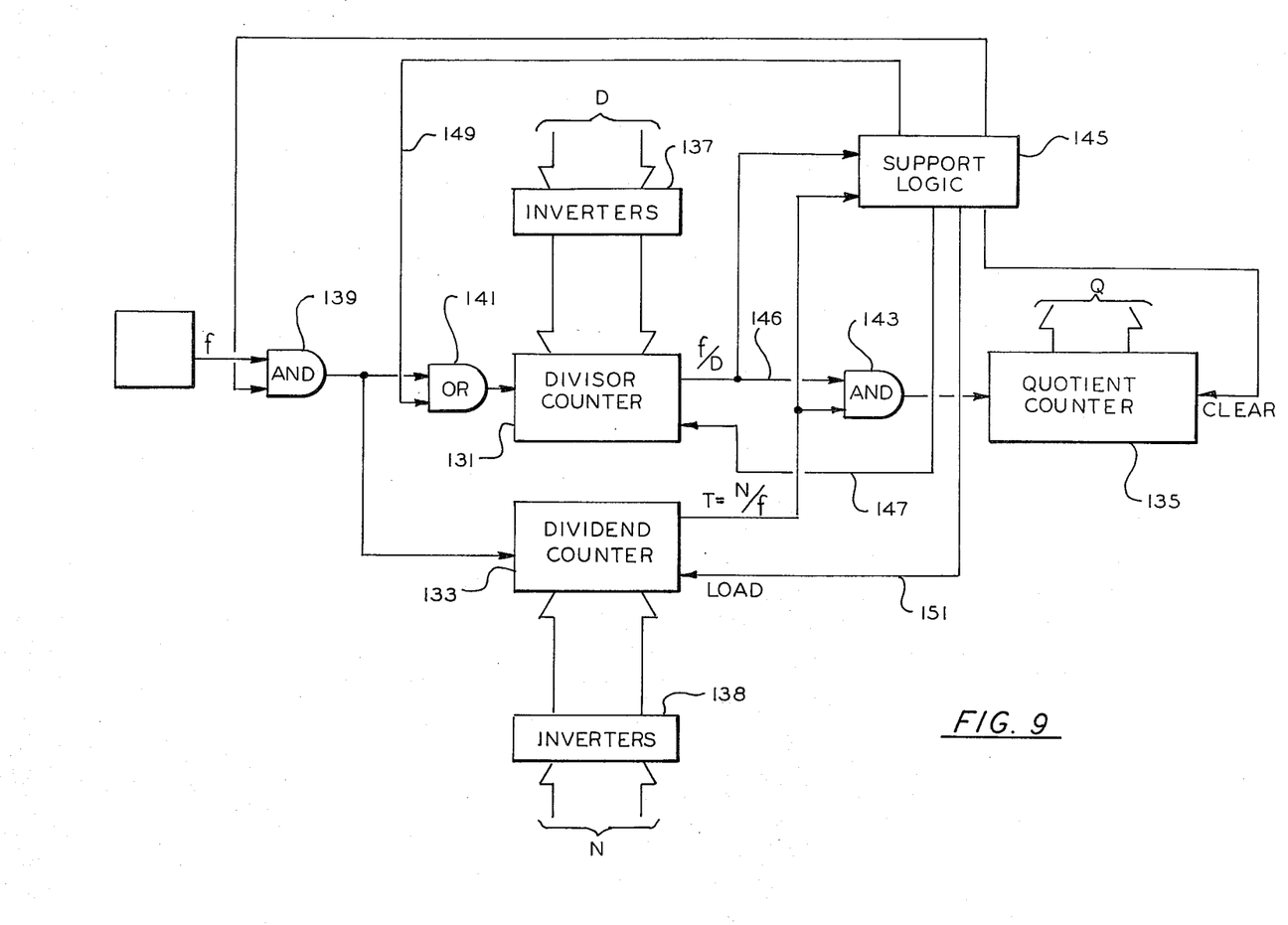
FIG. 9 is a block diagram of a logic arrangement for computing a ratio.

The output involving the difference of $f_{x1}$ and $f_{x2}$ represents the cross track velocity component $v_d$ directly and the output involving the sum of $f_{x1}$ and $f_{x2}$ must be divided by the square root of 3 to get a representation of the along track component $v_h$ to the same scale.

Figure 11:
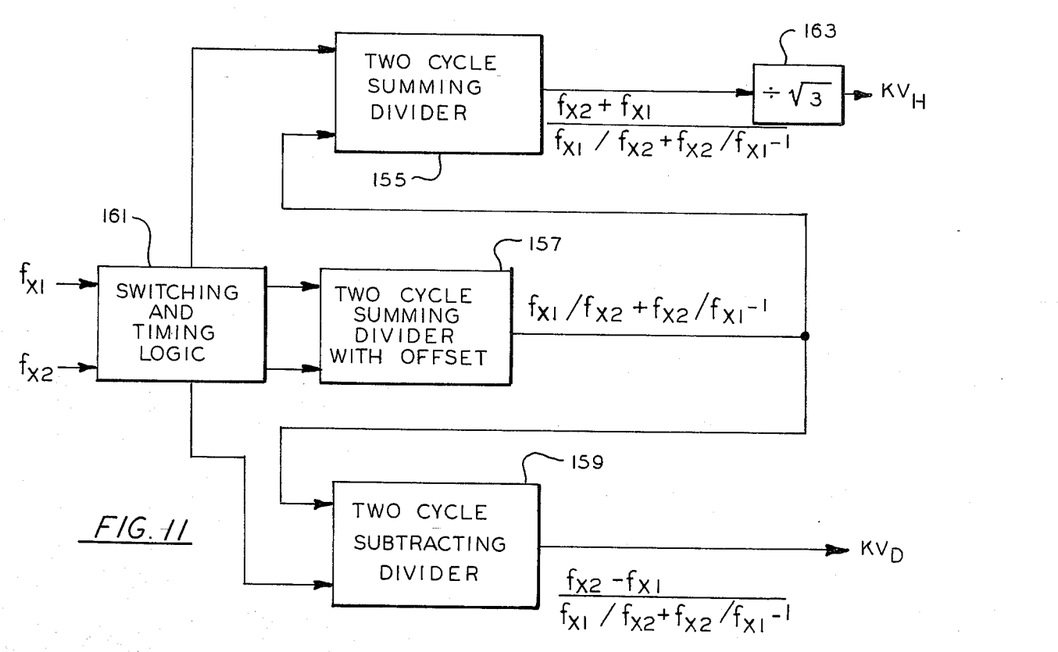
FIG. 11 is a block diagram illustrating an alternate computation arrangement for employing the circuit of FIG. 8.

FIG. 11 illustrates a functional block diagram for extracting $v_h$ and $v_d$ in this manner. Shown are three two cycle dividers such as those of FIG. 9 and indicated as 155, 157 and 159 respectively. Inputs of the quantities $f_{x1}$ and $f_{x2}$ are controlled by timing and switching logic 161. A further divider 163 for dividing by the square root of 3 is coupled to the output of the divider 155. The divider 157 develops the required denominator for $v_h$ and $v_d$ which is then used in the dividers 155 and 159 to develop terms having the sum of $f_{x2}$ and $f_{x1}$ in the numerator and the other having the difference. The sum term is then divided by the square root of 3 to provide an output proportional to $v_h$ and the difference term provided out directly as a quantity proportional to $v_d$.

Figure 12:
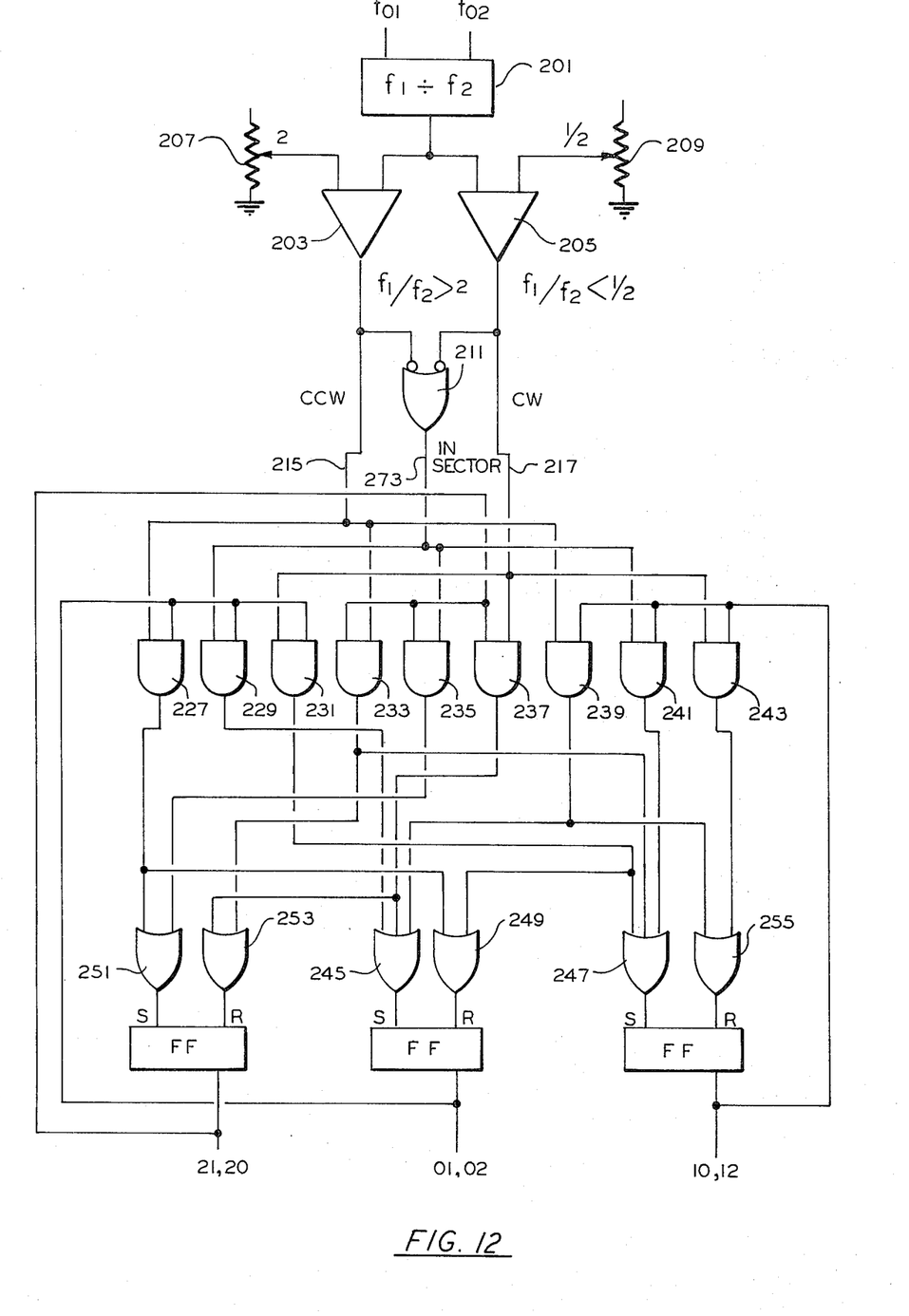
FIG. 12 is a logic diagram illustrating the switching logic.
Figure 13:
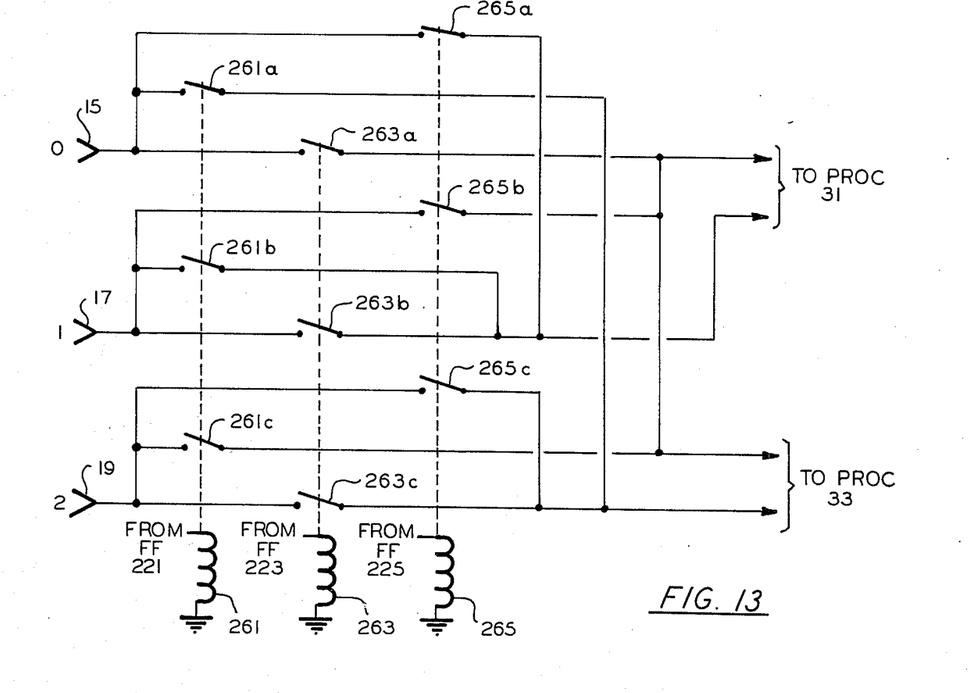
FIG. 13 is a schematic diagram of a switching matrix for use in the present invention.

With either of the above described computational schemes switching between sectors is necessary. When the ratio of the frequency $f_1$ over $f_2$ is between the limits of one-half and 2 the direction of the velocity vector is within either the sector 201 or the sector 203 of FIG. 10. If the ratio is greater than 2 then the velocity vector is either in section 205 or 207. That is, with respect to sectors 201 and 203 it is either less than $-30°$ or it is greater than $+150°$. If the ratio falls below one-half then sector 209 or 211 should be selected. This indicates that $\delta$, again referenced to the sectors 201 and 203 is either greater than 30° or less than $-150°$. It should be noted that once switching takes place for example from the sector 201 into the sector 209 that the value of $\delta$ will be referenced to a new reference axis such as the reference axis 213. This means that it is necessary at all times to know which sector is being used and based on that, make a decision as to which other sector to go to. The sector switching logic is shown on FIG. 12. The signals $f_1$ and $f_2$ from the discriminators of FIG. 8 are provided as inputs to a divider 201 where the ratio of $f_1/f_2$ is taken. The output of divider 201 is provided as an input into comparators 203 and 205. Comparator 203 has as a reference input, a value from a potentiometer 207 representing a ratio of 2. It is arranged so that its output will become a logical "1" if the ratio exceeds the reference input. Comparator 205 has as a reference input, a value from a potentiometer 209 corresponding to one-half. Comparator 205 will have an output going from a logical 1 to a logical 0, from a logical 0 to a logical 1 when the ratio drops below one-half. The outputs of comparators 203 and 205 are provided to a NOR gate 211. As a result, on line 213, a 1 output will indicate that the drift angle is within the selected sector. An output on line 215 will indicate that the angle has gone out of the sector in a counter-clockwise direction and an output on line 217 that it has gone out of the sector in a clockwise direction. Before a decision can be made as to which sector to go if a signal appears on line 215 or 217, it is necessary to know which sector was previously selected and is at that time in operation. In other words, which pairs of receiving horns are being used. To store this indication, three flipflops 221, 223 and 225 are used. These correspond respectively to the pairs indicated at their outputs. The output from flipflop 223 is fedback as a first input to three AND gates 227, 229 and 231, thus enabling them when within the 01, 02 sector either sector 201 or 203 of FIG. 10. Similarly, the output of flipflop 221 is fed back to AND gates 233, 235 and 237 to enable those gates when in the 21, 20 sector. The output of flipflop 225 is fed back to enable gates 239, 241 and 243 when in the 10, 12 sector. The second inputs of each of the three sets of three gates are the outputs on lines 213, 215 and 217. Operation when within the sector 201 or 203 [01, 02,] will be explained. Operation in the other sectors takes place in the same manner. When within the sector flipflop 223 will be set and the gates 227, 229 and 231 enabled. A logical 1 signal will be present on the line 213 causing gate 229 to have an output. This output is provided through an OR gate 245 to the input of flipflop 223. If deviation beyond the limits in a clockwise direction takes place, the output on line 213 will become a 0 and that on 217 a 1. This causes the gate 231 to have a 1 output. Gate 231 has its output as one input to an OR gate 437 at the set input of flip-flop 225. The output is also coupled to an OR gate 249 at the reset input of flipflop 223. Thus, when a signal appears on line 217 indicating a movement past the limit in the clockwise direction, flipflop 223 will be reset and flipflop 225 set to cause operation to shift to the 10, 12 sector. Similarly, if an output appeared on line 215 indicating an excess in the counter clockwise direction, gate 227 would provide an output to set flipflop 221 through OR gate 251 and to reset flipflop 223 through OR gate 249. In a similar manner, OR gate 253 has inputs from gates 233 and 237 to cause flipflop 221 to be reset when a signal directing a switching out of the sector 21, 20 occurs. The same thing happens wit OR gate 255 when a signal from gate 239 or gate 243 indicates a switch out of the 10, 12 sector. The output signals from flipflops 221, 223 and 225 are used to generate switching commonds for the switching matrix and also to provide outputs indicating the sector in which operation is taking place in order to permit knowing which sector operation is taking place. FIG. 13 illustrates how these signals are used in the switching matrix. A switching matrix made up of a plurality of relay switches is illustrated. It will be recognized that other types of switching such as the use of solid-state switching employing field effect transistors or the like may equally well be used. The output signal of flipflop 221 is provided to a relay coil 261 having contacts 261A, 261B, and 261C similarly the output of flipflop 223 drives a relay coil 263 having contacts 263A, 263B and 263C. The output from flipflop 225 drives relay coil 265 having contacts 265A, 265B and -265C. The contacts 261A 263A and 265A have their input coupled to the horn 15 the contacts 261B, 263B and 265B to the horn 17 and the contacts 261C, 263C and 265C to the horn 19. Energization of relay 263 will result in its associated contacts being colosed and the output of horn 15 will be provided on the output lines to both processers 31 and 33 with the output of horn 17 being provided as the other input to processor 31 and the output of horn 19 to the other input of processor 33. In similar manner, energization of relay 261 will result in the output of horn 19 being provided as the first input to both processors and the output of horn 17 and 15 respectively as the second inputs to processors 31 and 33. Energization of relay 265 and the closure of its associated switches will case the output of horn 17 to be provided as the first input to first processors and the outputs of horn 15 and 19 respectively to be provided as the second inputs to processors 31 and 33.

Although the switching matrix is indicated as being located at the horns themselves, it should be noted that it also is possible to provide one of the power sensors 43 and 45 for each horn and to provide switching between the power sensors and the remainder of the processor. These and other modifications may be made without departing from the spirit of the invention which is intended to be limited solely by the appended claims.

I claim:

1. Velocity sensing apparatus comprising:
   a. means to illuminate an area on the ground with radar energy;
   b. three receiving antennas having their centers arranged on the apexes of an equilateral triangle,
   c. coupling means having the outputs of said three antennas as inputs and providing as outputs first and second pairs of outputs made up of combinations of the outputs of said three antennas; one of said antenna outputs being common to both pairs;
   d. first and second signal processors having said first and secod pairs as inputs respectively and each providing as outputs a first signal representing the sum of two inputs and a second signal representing the difference of the two inputs;
   e. first and second cross-over trackers having the first and second outputs of said first and second signal processors as respective inputs and providing as outputs the respective crossover frequency of said sum and difference inputs;
   f. means associated with each of said signal processors for determining the slope of the difference signal at a point where it crosses a frequency $f_o$ and providing an output indicative thereof, said output being provided as an input to control the feedback polarity of its associated crossover tracker; and
   g. means for computing velocity having as inputs the outputs of said first and second crossover trackers.

2. Apparatus as in claim 1 wherein said means for computing velocity include means for computing velocity along heading and cross-heading.

3. Apparatus as in claim 1 wherein said coupling means comprise switching means.

4. Apparatus according to claim 1 and further including means for determinig the direction of heading and providing an output to said switching means to select as the common antenna output in said pairs the antenna having as a reference axis a line bisecting its association apex which reference axis does not deviate more than 30° from the heading direction.

5. Apparatus according to claim 1 wherein each of said first and second signal processors comprise:
   a. a first power sensor having as an input one output of a pair of antennas;
   b. a second power sensor having as an input the output of the other antenna of a pair;
   c. a carrier oscillator having a direct and a quadrature output;
   d. a first balanced modulator having as inputs the output of said first power sensor and the direct output of said carrier oscillator;
   e. a second balanced modulator having as an input the output of said first power sensor and the quadrature output of said carrier oscillator;
   f. a third balanced modulator having as inputs the outputs of said second power sensor and the direct output of said carrier oscillator;
   g. first summing means having as inputs the output of said first and third balanced modulators and providing an output which is said sum output; and
   h. second summing means having as inputs the outputs of said second and third balance modulators and providing said difference output.

6. Apparatus according to claim 1 wherein said mean for determining slope comprise:
   a. means for developing first and second signals, one containing components of a reference frequency plus an increment and the other containing components of said reference frequency minus said increment;
   b. means to mix said signals with said difference output; and
   c. means to compare said signals and provide an output indicative of slope.

7. Apparatus as in claim 6 wherein said means for developing comprise:
   a. first oscillator operating at said reference frequency and providing first and second outputs at said frequency, said outputs being a direct output and a quadrature output;
   b. second oscillator providing third and fourth outputs at said increment frequency, said outputs being a direct output and a quadrature output;
   c. first and second balanced modulators combining respectively the direct and quadrature outputs of said first and second oscillators;
   d. subtracting means having as inputs the outputs of said first and second balanced modulators;
   e. summing means having as inputs the outputs of said first and second balanced modulators, said subtracting means providing said first signal and said summing means said second signal; and wherein said means for mixing comprise
   f. a first mixer having as an input the output of said subtracting means and a second mixer having as an input the output of said summing means, and wherein said means for differencing comprise;
   g. first and second filters having at the outputs of said first and second mixers as respective inputs;
   h. first and second square law detectors having the outputs of said filters as inputs; and
   i. differencing means having the outputs of said first and second square law detectors as inputs.

8. Apparatus as in claim 1 wherein said means for computing velocity include means for computing drift angle.

9. Apparatus as in claim 8 wherein said means for computing velocity and drift angle comprise:
   a. first and second discriminators having as inputs the outputs of said first and second crossover trackers and as a reference input a reference frequency;

b. first subtracting means having as inputs the outputs of said first and second discriminators;
c. first summing means having as inputs the outputs of said first and second discriminators;
d. means for multiplying the output of said means for subtracting by the square of three;
e. first and second balanced modulators having as respective inputs the output of said multiplier and the output of said summing means;
f. said first balance modulator having as an additional input $\sin\omega t$ and said second balance modulator and input $\cos\omega t$;
g. second summing means having as inputs the outputs of said first and second balanced modulators;
h. a phase meter having as inputs a reference signal $\cos t$ and the output of said second summing means;
i. means for providing a constant value $n/6$;
j. third summing means having as inputs the output of said phase meter and said constant value;
k. second subtracting means having as inputs the output of said phase meter and output of said constant means;
l. first and second cosine generators having as respective inputs the outputs of said third summing means and said second subtracting means;
m. a rectifier having as an input an output of said second summing means;
n. a second multiplier having as inputs the output of said rectifier and the output of said first cosine generator; and
o. a second multiplier having as a first input the output of said first multiplier and as a second input the output of said second cosine generator.

10. Apparatus according to claim 9 and further including means for determining the direction of heading and providing an output to said switching means to select as the common antenna output in said pairs the antenna having as a reference axis a line bisecting its associated apex which reference axis does not deviate more than 30° from the heading direction.

11. Apparatus according to claim 10 wherein said means for determining direction comprise;

a means having the outputs of said first and second discriminators as inputs and providing one output when the result of the division of the output of said first discriminator by the output of said second discriminator is less than one half and another output when said result is greater than two and logic means responsive to said outputs to provide outputs to said switching means.

12. A method of determining velocity using a single means to illuminate an area on the ground with radar energy and three receiving antennas having their centers on the apexes of an equilateral triangle to receive reflected radar energy there from comprising:
a. grouping the outputs of the three antennas into two pairs with a common antenna in each pair:
b. determining for each pair a direct sum of the two outputs and a quadrature sum of the two outputs;
c. computing the crossover frequency of the direct and quadrature sum in each pair; and
d. using the two computed frequencies to determine velocity.

13. The method of claim 12 wherein said grouping is done such that the common antenna is the one having as a reference axis a line bisecting its associated apex which reference axis does not deviate more than 30° from the heading direction of the velocity being computed.

14. The method of claim 13 wherein said two computed frequencies are $f_{01}$ and $f_{02}$, velocity is V, the angle between said heading direction and said reference axis is $\delta$ and said velocity is determined by automatically solving the equations:

$$\sqrt{3}\,\frac{f_{01}-f_{02}}{f_{01}+f_{02}} = \tan\delta$$

and $$\sqrt{(f_{01}+f_{02})^2 + 3(f_{01}-f_{02})^2} = \frac{\sqrt{3}\,V}{4d\cos(\delta+\pi/6)\cos(\delta-\pi/6)}$$

where $d$ is the length of a leg of said equilateral triangle.

* * * * *